March 21, 1961  H. A. FERGUSON  2,975,643
SELECTIVE DUAL POWER TAKE-OFF
Filed Nov. 13, 1958  2 Sheets-Sheet 1

INVENTOR.
H. A. FERGUSON

March 21, 1961  H. A. FERGUSON  2,975,643
SELECTIVE DUAL POWER TAKE-OFF
Filed Nov. 13, 1958  2 Sheets-Sheet 2

INVENTOR.
H. A. FERGUSON

United States Patent Office 2,975,643
Patented Mar. 21, 1961

2,975,643
SELECTIVE DUAL POWER TAKE-OFF
Henry A. Ferguson, Waterloo, Iowa, assignor to Deere & Company, Moline, Ill., a corporation of Delaware
Filed Nov. 13, 1958, Ser. No. 773,663
6 Claims. (Cl. 74—15.2)

This invention relates to a power take-off and more particularly to a dual power take-off for agricultural tractors and applied implements.

The operation of agricultural implements by power take-offs on associated tractors is a development that has been standardized since 1923, and the standards set by the industry cover such things as power take-off shaft size, speed, location and other characteristics relative to the tractor and the types of implements to be operated thereby. The standardized power take-off shaft has heretofore been a six-splined shaft driven at a speed of 540 r.p.m. On the basis of these factors, implements have been designed so as to be interchangeable or useful with tractors of different makes.

More recently, the industry has adopted a new standard, the significant changes in which are an increase in the power take-off shaft r.p.m. to 1,000 and the use of twenty-one splines rather than six. The new standards introduce many advantages but obviously create the disadvantage that the new power take-off shaft cannot be used with older implements, primarily because of the difference in number of splines and the difference in r.p.m. In the first place, the older implement couplings would not fit the new shaft, but of more importance the older implements, designed for the slower speed, could not be driven at the higher speed without injurious effects. Therefore, it becomes expedient to provide some form of means whereby the newer tractors may be either convertible to the lower speed power take-off or designed in the first place with provision for two power take-offs, one operating at 540 r.p.m. and the other at 1,000 r.p.m. The present invention falls in the latter class and has therefore as its main object the provision of an improved power take-off mechanism including two power take-off outputs, one operating at 540 r.p.m. and the other at 1,000 r.p.m. It is a significant object of the invention to utilize a power take-off shaft adapter selectively interchangeable between the two power take-off outputs in such manner that the adapter when used with the 540 r.p.m. output presents a six-spline end for attachment to the propeller shafts of old implements and, when connected to the 1,000 r.p.m. output, presents the new twenty-one toothed spline for connection to later model implements. Along these lines, it is a specific object of the invention to utilize a single shaft having a six-toothed spline at one end and a twenty-one-toothed spline at its opposite end, and to provide the outputs as tubular shafts in which the 1,000 r.p.m. output has an internal six-toothed spline and the 540 r.p.m. output has an internal twenty-one-toothed spline.

The foregoing and other important objects and desirable features inherent in and encompassed by the invention will become apparent as a preferred embodiment thereof is disclosed by way of example in the ensuing description and accompanying sheets of drawings, the several figures of which are described below:

Figure 1:
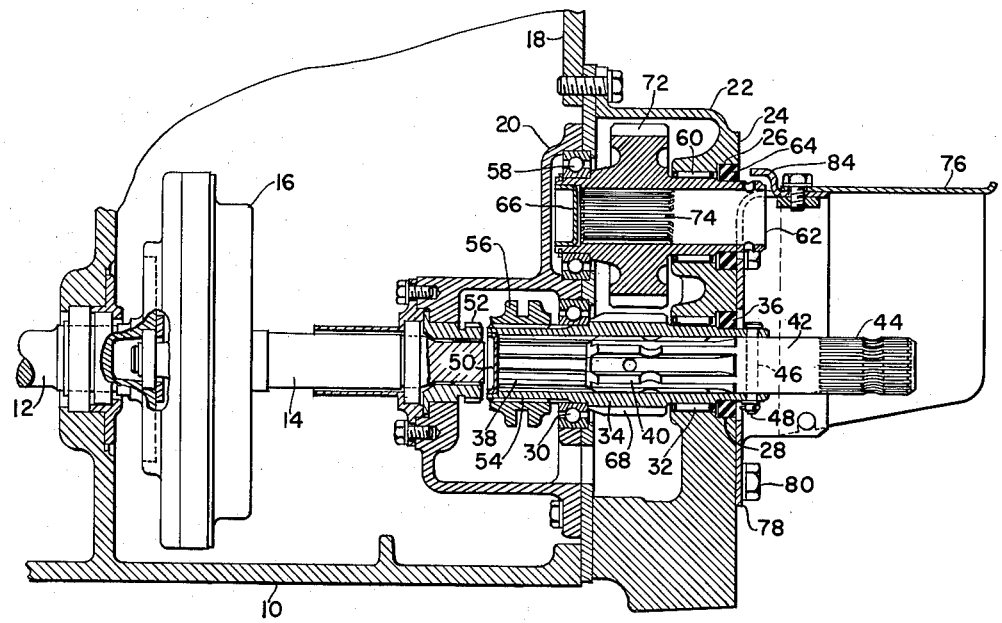
Fig. 1 is a longitudinal sectional view of the rear portion of a tractor transmission in which the novel selective dual power take-off output mechanism is provided, showing the power take-off shaft driven from the 1,000 r.p.m. output.

The numeral 10 represents the rear portion of a typical tractor transmission case or housing and journals therein a drive shaft 12 which is selectively connectible to and disconnectible from a tail shaft 14 by a friction clutch 16. The transmission case has a rear wall 18 which supports auxiliary housing means including an internal housing support 20 and an external housing 22. The external housing 22 has a rear wall 24 which is provided with upper and lower circular openings 26 and 28 respectively. Suitable bearings 30 and 32 journal a lower tubular output shaft 34 coaxially with the rear end of the tail shaft 14 and the rear end of this shaft 34 extends rearwardly through the lower opening 28. A suitable seal 36 is installed in the opening. The interior of the tubular shaft 34 is appropriately splined, herewith six splines at 38 for at times receiving the six-toothed splined end 40 of a power take-off shaft 42. The opposite end of this shaft is formed with a twenty-one-toothed spline as at 44. The shaft 42 is cross-drilled at 46 to receive a pin 48 for retaining it against axial displacement relative to the tubular shaft 34. When the shaft 42 is removed from the tubular shaft 34, the rear end of the tubular shaft will be open. For this reason, the opposite or forward end of the shaft 34 is plugged at 50 to prevent the entrance of dirt and other foreign matter.

The rear end of the tail shaft 14 is externally toothed at 52 and and similar external teeth are provided at 54 on the forward end of the shaft 34. An internally toothed clutch collar 56 is axially shiftable between the coaxial toothed portions 52 and 54 for selectively connecting and disconnecting these portions. When the collar 56 is in its forward position to connect the two shafts 14 and 34, the friction clutch 16 may be used to temporarily disconnect the power take-off shaft from the drive shaft 12. When it is desired to leave the power take-off shaft idle, the clutch 56 will be moved to its disconnected position as illustrated.

The housing structure 20—22 carries an upper pair of fore-and-aft spaced bearings 58 and 60 which journal an upper tubular shaft 62 which is parallel with the lower tubular shaft 34 and which is in coaxial register with the upper opening 26. A suitable seal 64 surrounds the shaft 62 in the opening 26. The forward end of the shaft 62 is closed by a plug 66, since when the power take-off shaft 42 is used in the lower shaft 34, the rear end of the upper shaft will be open. The speed of rotation of the shaft 12 is such that the direct connection thereof to the shaft 34 via the clutches 16 and 56 drives the shaft 34 at 1,000 r.p.m., according to the standards adopted here. Consequently, when the power take-off shaft 42 is coupled to the output shaft 34 via the splined coupling means 38—40, the power take-off shaft rotates at that speed and presents at its rear end the twenty-one-toothed splined portion 44 for connection to the propeller shaft of whatever implement is driven by the tractor, it being assumed that the implement is of the type to which the higher 1,000 r.p.m. speed is adaptable.

The upper shaft 62 is driven at the lower speed of 540 r.p.m by means of reduction gearing including a pinion 68 integral with the lower shaft 34, an idler 70 (Fig. 3) and a larger gear 72 integral with the upper tubular shaft 62. This upper shaft is internally splined with twenty-one splines at 74, which of course matches the twenty-one toothed spline 44 on the power take-off shaft 42, so that when the shaft 42 is axially withdrawn from the lower shaft 34 and turned end for end, the splined end 44 fits the internal splines 74 in the upper shaft and presents the six-toothed spline at the rear (Fig. 2) for coupling to the propeller shaft of implements designed to operate at the lower or 540 r.p.m. speed. The same pin 48 may be used in connecting the shaft 42 to either of the shafts 34 or 62.

Figure 2:
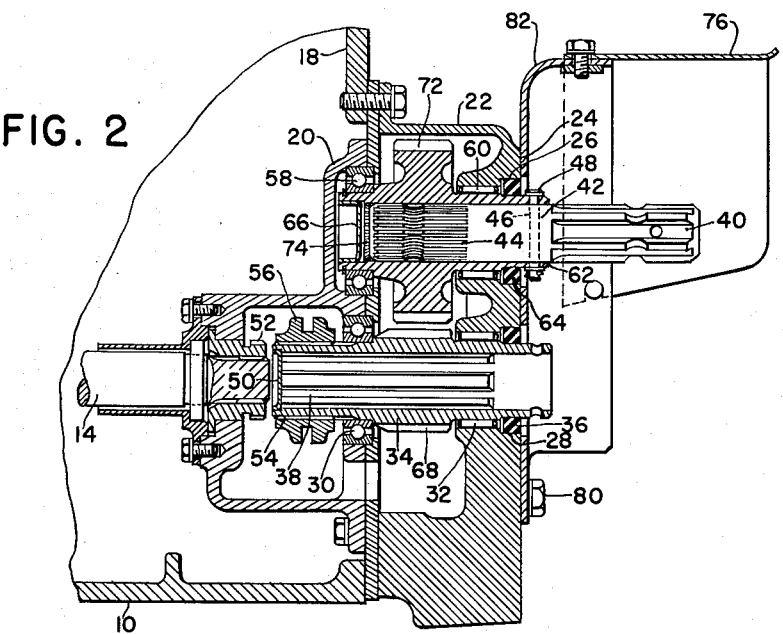
Fig. 2 is a similar sectional view showing the power take-off shaft interchanged so as to be driven by the 540 r.p.m. output.
Figure 3:
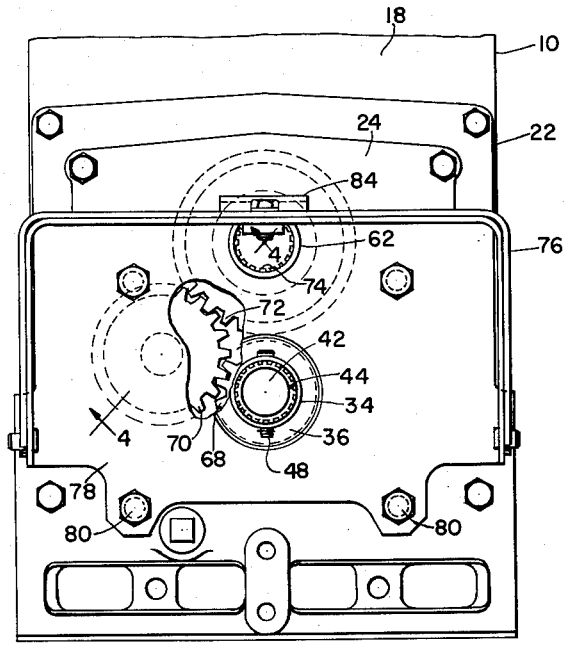
Fig. 3 is a rear view, with a portion thereof broken away, of the structure shown in Fig. 1.
Figure 4:
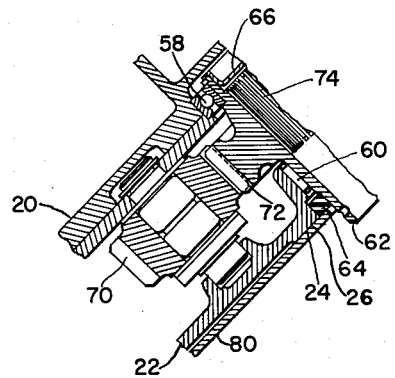
Fig. 4 is a section on the line 4—4 of Fig. 3.

As shown in Fig. 1, a typical safety shield 76 may be mounted on the rear wall 24 of the housing 22 via an intervening support 78 which is held in place by cap screws 80. In the case of Fig. 2, the shield 76 is used with a different insert or support 82 which may again use the cap screws 80.

The smaller insert or bracket 78 for use with the shield 76 in the Fig. 1 situation includes a lip 84 which lies in protective relation to the exposed rear end of the upper shaft 62. In the case of Fig. 2, the shield support 82 is designed to protectively enclose the rear ends of both shafts 62 and 34.

The invention embodies extreme simplicity in the interchangeability of the shaft 42 between the two output shafts which, combined with the two different types of splines, presents the proper spline for use at the proper speed, and thereby prevents the user from employing the incorrect speed with the associated implement. As indicated, the use of the higher speed with an implement designed for the lower speed could be injurious, if not dangerous. The housing structure 20 and 22 is designed to fit tractors in production as well as those in the field, in which latter case the housing structure may be used as a conversion unit.

Features in addition to those above outlined will readily occur to those versed in the art, as will many modifications and alterations in the preferred embodiment illustrated, all without departure from the spirit and scope of the invention.

What is claimed is:

1. A dual power take-off for an agricultural tractor or the like, comprising: a support; first and second shafts journaled on the support; means driving said shafts to cause one shaft to rotate at a speed different from that of the other; a power take-off shaft positioned as a coaxial extension of the first shaft and having a first end proximate to said first shaft and a second end relatively axially remote from said first shaft; first cooperative coupling elements respectively on said first shaft and the first end of the power take-off shaft for disconnectibly connecting said first shaft and power take-off shaft, said power take-off shaft being separable from the first shaft to be turned end for end and disposed as a coaxial extension of the second shaft so that its second end is proximate to said second shaft and its first end is relatively axially remote from said second shaft; and second cooperative coupling elements respectively on said second shaft and said second end of the power take-off shaft and different from the first coupling elements, said first and second coupling elements being mutually exclusive so that the power take-off shaft is connectible to the first shaft only via said first elements and is connectible to the second shaft only via said second elements.

2. In a dual power take-off and drive system for agricultural tractors and the like, the combination comprising: a housing having an upright rear wall provided with upper and lower openings; a tubular lower shaft journaled in the housing coaxially with the lower opening and having an open rear end portion extending rearwardly through said lower opening, said shaft being formed with internal splines; a power shaft in the housing connected to and for driving the lower shaft at a certain speed; a tubular upper shaft journaled in the housing coaxially with the upper opening and having an open rear end portion extending rearwardly through said upper opening, said upper shaft being formed with internal splines different from the splines in the lower shaft; drive means operative between the two shafts for driving the upper shaft from the lower shaft at a speed different from that of the lower shaft; and a power-transmitting take-off shaft having front and rear opposite end portions, said front end portion having external splines matching the internal splines of the lower shaft and forwardly inserted into said lower shaft and mounting said power-transmitting shaft in and as a rearwardly removable coaxial extension of said lower shaft so that said rear end portion of said power-transmitting shaft projects rearwardly beyond the rear end portion of said lower shaft, and said rear end portion of the power-transmitting shaft having external splines matching the internal splines of the upper shaft whereby said power-transmitting shaft is rearwardly removable from the lower shaft for reversal end-for-end for forward axial insertion of the rear end portion thereof into said upper shaft.

3. In a dual power take-off and drive system for agricultural tractors and the like, the combination comprising: a housing having an upright rear wall provided with upper and lower openings; a lower shaft journaled in the housing coaxially with the lower opening and having a rear end portion accessible via said lower opening, said shaft being tubular and opening axially at said rear end portion and being formed with internal splines; an upper shaft journaled in the housing coaxially with the upper opening and having a rear end portion accessible via said upper opening, said upper shaft being tubular and opening axially at its rear end portion and being formed with internal splines different from the splines in the lower shaft; drive means for driving the upper and lower shafts to cause one shaft to rotate at a speed different from that of the other shaft; and a power-transmitting shaft having first and second opposite end portions, said first end portion having external splines matching the internal splines of the lower shaft and forwardly inserted into said lower shaft and mounting said power-transmitting shaft in said lower shaft with said second portion projecting rearwardly beyond the rear end portion of said lower shaft, and said second portion having external splines matching the internal splines of the upper shaft whereby said power-transmitting shaft is rearwardly removable from the lower shaft for reversal end-for-end for forward axial insertion of its second end portion into said upper shaft.

4. In a dual power take-off and drive system for agricultural tractors and the like, the combination comprising: a housing having a wall provided with first and second openings; a first shaft journaled in the housing coaxially with the first opening and having an end portion accessible via said first opening, said shaft being tubular and opening axially outwardly at said end portion and being formed with internal splines; a second shaft journaled in the housing coaxially with the second opening and having an end portion accessible via said second opening, said second shaft being tubular and opening axially outwardly at its end portion and being formed with internal splines different from the splines in the first shaft; drive means for driving the first and second shafts to cause one shaft to rotate at a speed different from that of the other shaft; and a power-transmitting shaft having first and second opposite end portions, said first end portion having external splines matching the internal splines of the first shaft and axially inwardly inserted into the first shaft and mounting said power-transmitting shaft in said first shaft with said second portion of said power take-off shaft exposed axially outwardly beyond the first shaft end portion, and said second portion of the power-transmitting shaft having external splines matching the internal splines of the second shaft whereby said power-transmitting shaft is axially outwardly removable from the first shaft for end-for-end reversal and axial inward insertion of its second end portion into said second shaft.

5. In a dual power take-off and drive system for agricultural tractors and the like, the combination comprising: a support; a tubular first shaft journaled in the support and having an outer open end portion and further having internal splines; a tubular second shaft journaled in the support and having an open end portion and further having internal splines different from those of the first shaft; means for driving the shafts to cause one shaft to rotate at a speed different from that of the other shaft; and a power-transmitting shaft having first and second opposite ends, said first end being formed with first external splines matching the internal splines of the first shaft and axially inserted into the open end of the first shaft and removably mounting said power take-off shaft in said first shaft with said second end of said power-transmitting shaft projecting axially outwardly from said first shaft, and said second end of said power-transmitting shaft being formed with external splines matching the internal splines of the second shaft whereby said power-transmitting shaft is axially removable from the first shaft for axial insertion of its second end into the open end of the second shaft.

6. In a dual power take-off and drive system for agricultural tractors and the like, the combination comprising: a support; a first shaft journaled in the support and having an end portion and further having coupling means thereon; a second shaft journaled in the support and having an end portion and further having coupling means thereon different from the coupling means of the first shaft; means for driving the shafts to cause one shaft to rotate at a speed different from that of the other shaft; and a power-transmitting shaft having first and second opposite ends provided respectively with first and second coupling elements respectively matching the different coupling means of the first and second shafts, said power-transmitting shaft having connection to the first shaft coupling means via its first coupling element so as to expose the second coupling element, and said connection being separable to enable disconnection of the power-transmitting shaft from said first shaft for substituted connection thereof to the second shaft coupling means via said second coupling element.

References Cited in the file of this patent

UNITED STATES PATENTS

| | | |
|---|---|---|
| 2,703,987 | Mueller | Mar. 15, 1955 |
| 2,743,615 | Keese | May 1, 1956 |
| 2,838,940 | Swensen et al. | June 17, 1958 |

FOREIGN PATENTS

| | | |
|---|---|---|
| 179,980 | Austria | Oct. 25, 1954 |